(12) United States Patent
Kim et al.

(10) Patent No.: US 9,746,547 B2
(45) Date of Patent: Aug. 29, 2017

(54) METHOD AND APPARATUS FOR GENERATING DEPTH IMAGE

(71) Applicant: Samsung Electronics Co., Ltd., Suwon-si (KR)

(72) Inventors: Sunkwon Kim, Suwon-si (KR); Seungwon Jung, Seoul (KR); Ouk Choi, Yongin-si (KR); Byongmin Kang, Yongin-si (KR); Jungsoon Shin, Yongin-si (KR); Keechang Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 233 days.

(21) Appl. No.: 14/597,381

(22) Filed: Jan. 15, 2015

(65) Prior Publication Data

US 2015/0334372 A1     Nov. 19, 2015

(30) Foreign Application Priority Data

May 19, 2014   (KR) ......................... 10-2014-0059959

(51) Int. Cl.
*G06T 15/04* (2011.01)
*G06T 7/00* (2017.01)
(Continued)

(52) U.S. Cl.
CPC ............ *G01S 7/4808* (2013.01); *G01S 17/36* (2013.01); *G01S 17/89* (2013.01); *G06T 15/04* (2013.01);
(Continued)

(58) Field of Classification Search
CPC ........ G01S 17/36; G01S 17/89; G01S 7/4808; G06T 15/04; G06T 15/506;
(Continued)

(56) References Cited

U.S. PATENT DOCUMENTS 7,450,220 B2    11/2008   O'Connor et al.
8,345,945 B2 *   1/2013   Song ................... G06T 7/2033
                                                          382/131

(Continued)

FOREIGN PATENT DOCUMENTS

KR    10-2011-0032402 A        3/2011
KR       10-1225482 B1         1/2013
KR    WO 2013/009099    *      1/2013    ............. H04N 5/357

OTHER PUBLICATIONS

Foix, S., et al., "Lock-in Time-of-Flight (ToF) Cameras: A Survey," IEEE Sensors Journal, vol. 11, No. 3, Mar. 2011, pp. 1-11 (in English).

*Primary Examiner* — Reza Aghevli
(74) *Attorney, Agent, or Firm* — NSIP Law

(57) ABSTRACT

A method of generating a depth image includes irradiating an object with a light which is generated from a light source, acquiring a plurality of phase difference signals which have different phase differences from one another, by sensing a reflection light reflected from the object, generating a first depth image based on the plurality of phase difference signals, generating a second depth image based on phase difference signals in which a motion artifact has not occurred, among the plurality of phase difference signals, generating a third depth image by combining the first depth image and the second depth image.

18 Claims, 7 Drawing Sheets

(51) Int. Cl.
*H04N 13/02* (2006.01)
*G01S 7/48* (2006.01)
*G06T 15/50* (2011.01)
*H04N 5/225* (2006.01)
*G01S 17/36* (2006.01)
*G01S 17/89* (2006.01)

(52) U.S. Cl.
CPC ......... *G06T 15/506* (2013.01); *H04N 5/2256* (2013.01); *H04N 13/0203* (2013.01); *G06T 2200/04* (2013.01); *G06T 2207/10012* (2013.01); *G06T 2207/10028* (2013.01); *G06T 2207/10152* (2013.01); *G06T 2207/20008* (2013.01); *G06T 2207/30244* (2013.01)

(58) Field of Classification Search
CPC ....... G06T 2200/04; G06T 2207/10012; G06T 2207/10028; G06T 2207/10152; G06T 2207/20008; G06T 2207/30244; G06T 7/0044; G06T 7/0071
See application file for complete search history.

(56) References Cited

U.S. PATENT DOCUMENTS

| | | | |
|---|---|---|---|
| 8,953,152 B2* | 2/2015 | Min | G01S 17/89 356/3.01 |
| 2012/0098935 A1* | 4/2012 | Schmidt | G01S 17/89 348/46 |
| 2012/0176476 A1* | 7/2012 | Schmidt | G01S 17/89 348/46 |
| 2013/0194460 A1 | 8/2013 | Nakashima et al. | |
| 2013/0242111 A1 | 9/2013 | Lee et al. | |
| 2013/0242211 A1* | 9/2013 | Lee | G02F 1/13338 349/12 |
| 2014/0104391 A1* | 4/2014 | Kim | H04N 13/0003 348/46 |
| 2015/0253417 A1* | 9/2015 | Patil | G01S 7/497 356/5.01 |
| 2015/0281099 A1* | 10/2015 | Banavalikar | H04L 12/4633 370/230 |
| 2015/0304534 A1* | 10/2015 | Kadambi | H04N 5/2256 348/207.11 |

* cited by examiner

METHOD AND APPARATUS FOR GENERATING DEPTH IMAGE

CROSS-REFERENCE TO RELATED APPLICATIONS

This application claims the benefit of Korean Patent Application No. 10-2014-0059959, filed on May 19, 2014, in the Korean Intellectual Property Office, the disclosure of which is incorporated herein in its entirety by reference.

BACKGROUND

1. Field

Example embodiments relate to a method and apparatus for generating a depth image, and more particularly, to a method and apparatus for generating a depth image which provide an improved depth image by removing a motion artifact and an offset.

2. Description of the Related Art

Recently, technologies such as 3D cameras, etc. for capturing distance information of an object are being developed. One such technology uses a time of flight (TOF) method which measures a distance between a capturing apparatus and an object by measuring a turnaround time of light.

According to the TOF method, light of a specific wavelength, for example, a near infrared ray of 850 nm, is projected onto an object by using a light-emitting diode (LED) or a laser diode (LD) and the light having the same wavelength is reflected from the object and is measured or captured by a photodiode or a camera and light processing is performed for extracting a depth image. A variety of TOF methods for performing the light processing which includes a series of operations such as light source projection, reflection from an object, optical modulation, capturing, and processing, have been developed.

A depth image using a TOF camera is acquired by calculating a phase difference between an irradiation light signal and a reflection light signal corresponding to the irradiation light reflected from an object during an integration time per each frame. In a case in which the TOF camera or the object oscillates during a time shorter than the integration time, there may be a variation in a phase of the reflection light signal. In this case, the acquired depth information according the reflection light signal may include incorrect values, thus causing a motion artifact to occur.

SUMMARY

Provided are a method and an apparatus for generating a depth image generating a depth image from which a motion artifact and an offset have been removed.

Additional aspects will be set forth in part in the description which follows and, in part, will be apparent from the description, or may be learned by practice of the presented example embodiments.

According to at least one example embodiment, a method of generating a depth image includes irradiating an object with a light which is generated from a light source, acquiring a plurality of phase difference signals which have different phase differences from one another, by sensing a reflection light reflected from the object, generating a first depth image based on the plurality of phase difference signals, generating a second depth image based on phase difference signals in which a motion artifact has not occurred, among the plurality of phase difference signals, generating a third depth image by combining the first depth image and the second depth image.

The acquiring of the plurality of phase difference signals may include acquiring a plurality of phase difference signals based on control signals having different phase differences from one another.

The generating of the first depth image may include generating first phase difference images based on the plurality of phase difference signals, generating a first depth image based on the first phase difference images, and the generating of the second depth image may include generating second phase difference images based on phase difference signals in which a motion artifact has not occurred, from among the plurality of phase difference signals, and generating the second depth image based on the second phase difference images.

The second depth image may be a depth image from which a motion artifact has been removed, and an offset effect may be included in the second depth image.

The generating of the third depth image may include generating a fourth depth image by changing depth values of the second depth image into corresponding depth values of the first depth image, and generating the third depth image by combining the first depth image and the fourth depth image.

The example method may further include calculating a weight factor with respect to the first depth image and the fourth depth image, based on an amplitude of the motion artifact, wherein the generating of the third depth image by combining the first depth image and the fourth depth image may include combining the first depth image and the fourth depth image based on the calculated weight factor.

The generating of the third depth image may include acquiring a first wavelet coefficient by performing wavelet transform on the first depth image, acquiring a second wavelet coefficient by performing wavelet transform on the fourth depth image, acquiring a third wavelet coefficient based on the first wavelet coefficient and the second wavelet coefficient, and acquiring a third depth image by performing inverse-wavelet transform on the third wavelet coefficient.

The third depth image may include depth information with respect to the object shown in the first depth image, and shape information with respect to the object shown in the second depth image.

The third depth image may include an image from which a motion artifact shown in the first depth image and an offset effect shown in the second depth image have been removed.

According to at least one example embodiment, an apparatus for generating a depth image includes a light irradiator irradiating an object with a light generated from a light source, a sensor acquiring a plurality of phase difference signals which have different phase differences from one another by sensing a reflection light reflected from the object, and an image processor generating a first depth image based on the plurality of phase difference signals, generating a second depth image based on phase difference signals in which a motion artifact has not occurred, from among the plurality of phase difference signals, and generating a third depth image by combining the first depth image and the second depth image.

The sensor may acquire the plurality of phase difference signals based on control signals having different phase differences from one another.

The image processor may generate first phase difference images based on the plurality of phase difference signals, generate the first depth image based on the first phase difference images, generate second phase difference images based on phase difference signals in which a motion artifact has not occurred, from among the plurality of phase difference signals, and generate the second depth image based on the second phase difference images.

The second depth image may include a depth image from which a motion artifact has been removed, and an offset effect may be included in the second depth image.

The image processor may generate a fourth depth image by changing depth values of the second depth image into corresponding depth values of the first depth image, and generate a third depth image by combining the first depth image and the fourth depth image.

The image processor may calculate a weight factor with respect to the first depth image and the fourth depth image based on an amplitude of the motion artifact, and combine the first depth image and the fourth depth image based on the calculated weight factor.

The image processor may acquire a first wavelet coefficient by performing wavelet transform on the first depth image, acquire a second wavelet coefficient by performing wavelet transform on the fourth depth image, acquire a third wavelet coefficient based on the first wavelet coefficient and the second wavelet coefficient, and acquire the third depth image by performing inverse-wavelet transform on the third wavelet coefficient.

The third depth image may include depth information with respect to the object shown in the first depth image, and shape information with respect to the object shown in the second depth image.

The third depth image may include a depth image from which a motion artifact shown in the first depth image and an offset effect shown in the second depth image have been removed.

BRIEF DESCRIPTION OF THE DRAWINGS

These and/or other example embodiments will become apparent and more readily appreciated from the following description of the example embodiments, taken in conjunction with the accompanying drawings in which.

DETAILED DESCRIPTION

Figure 1:
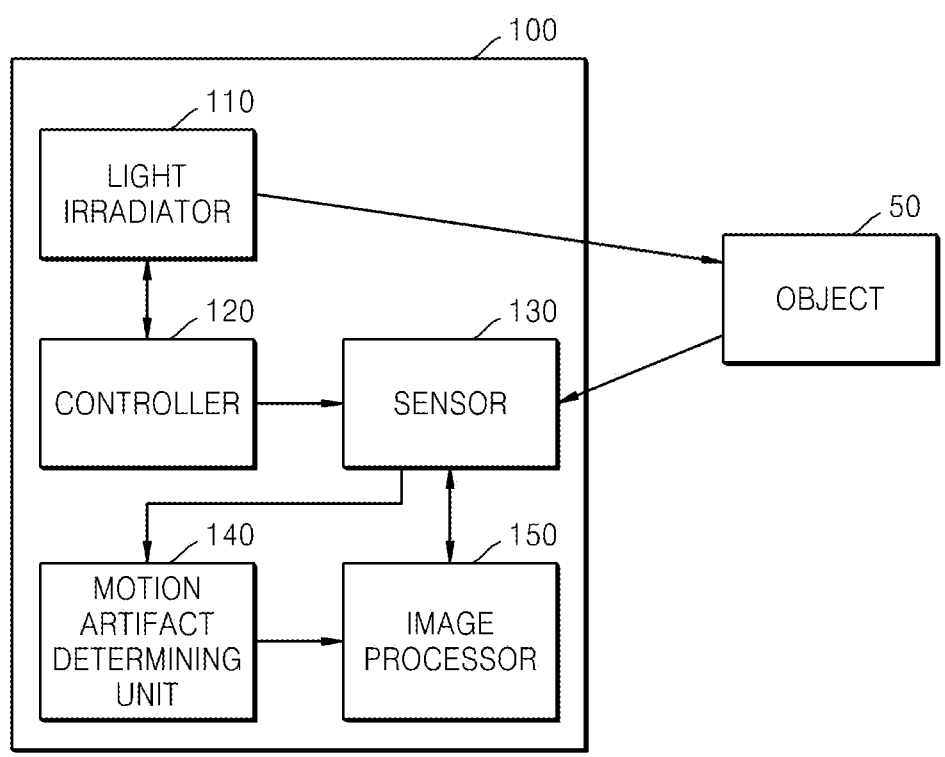
FIG. 1 is a block diagram showing a depth image generating apparatus according to example embodiments.

The terms used in this specification are those general terms currently widely used in the art in consideration of functions in regard to example embodiments, but the terms may vary according to the intention of those of ordinary skill in the art, precedents, or new technology in the art. Also, specified terms may be selected by the applicant, and in this case, the detailed meaning thereof will be described in the detailed description of the invention. Thus, the terms used in the specification should be understood not as simple names but based on the meaning of the terms and the overall description of the invention.

Throughout the specification, it will also be understood that when a component "includes" an element, unless there is another opposite description thereto, it should be understood that the component does not exclude another element but may further include another element. In addition, terms such as " . . . unit", " . . . module", or the like refer to units that perform at least one function or operation, and the units may be implemented as hardware or software or as a combination of hardware and software.

Reference will now be made in detail to example embodiments, examples of which are illustrated in the accompanying drawings, wherein like reference numerals refer to like elements throughout. In this regard, the present embodiments may have different forms and should not be construed as being limited to the descriptions set forth herein. Accordingly, example embodiments are merely described below, by referring to the figures, to explain aspects of the present description.

FIG. 1 is a block diagram showing a depth image generating apparatus 100 according to example embodiments.

Referring to FIG. 1, the image generating apparatus 100 may include a light irradiator 110, a controller 120, a sensor 130, a motion artifact determining unit 140, and an image processor 150.

The light irradiator 110 may include a light source for generating a light having a predetermined wavelength, and a light source driver for driving the light source. The light source may be a light emitting diode (LED) or a laser diode (LD), which emits light in the form of a near infrared (NIR) ray having a wavelength of about 850 nm, which is invisible to the naked eye. However, the light source and the wavelength of the light emitted by the light source are not limited thereto, and a variety of light sources and wavelengths and may be used.

The light source driver may drive the light source according to a control signal received from the controller 120. An irradiation light signal which is emitted from the light source and used to irradiate an object 50 may have a continuous periodic function form having a predetermined period. For example, the irradiation light signal may have a specially defined waveform such as a sine wave, a ramp wave, a rectangular wave, etc., and optionally, the irradiation light signal may have an undefined waveform.

The light irradiator 110 irradiates the object with an irradiation light signal and the irradiation light signal is reflected and returned from the object 50 as a reflection signal which is sensed by the sensor 130. The sensor 130 may include a photonic sensing device such as a pinned photo diode (PPD), a charge-coupled device (CCD) image sensor, etc.

The sensor 130 receives the reflection light signal, generates electrons, transmits the generated electrons to an integrator which integrates the electrons, and measures a quantity of the integrated electrons (a charge quantity). An integrating time and an integrating period of the electrons may be defined in advance.

The controller 120 may generate a control signal which controls a timing for integrating electrons which are generated by the sensor 130 when the sensor 130 receives the reflection light signal. The sensor 130 may include a plurality of integrators, and may transmit the generated electrons to the plurality of integrators according to the control signal.

The depth image generating apparatus using the time of flight (TOF) method generates L phases (where L is an integer) which are different from one another, and in a case in which the depth image generating apparatus includes M integrators (a storage for charges), the depth image generating apparatus may be operated by an L-phase/M-tap method.

Accordingly, the sensor 130 may sense the reflection light signal and integrate a plurality of charge quantities, and acquire phase difference signals corresponding to the plurality of charge quantities integrated, according to the control signal which has phases different from one another. A detailed description thereof will be given below, by referencing FIG. 2.

The motion artifact determining unit 140 may determine whether or not a motion artifact has been generated. For example, the motion artifact determining unit 140 may determine a generation of the motion artifact based on a sum of acquired phase difference signals during one period not being constant (refer to equation 5 below) when the motion artifact has been generated.

The image processor 150 may generate a depth image from which the motion artifact has been removed, and may generate a depth image from which the motion artifact and an offset have been removed, based on the depth image from which the motion artifact has been removed and an existing depth image from which the motion artifact has not been removed, for example, by combining the depth image from which the motion artifact has been removed and the existing depth image from which the motion artifact has not been removed.

FIG. 2 is a diagram showing an irradiation light signal, a reflection light signal, and phase difference signals according to example embodiments.

Figure 2A:
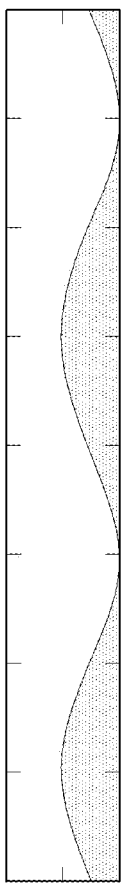
FIGS. 2A, 2B, 2C, 2D, 2E, 2F are diagrams explaining an irradiation light signal, a reflection light signal, and phase difference signals according to example embodiments.

FIG. 2A illustrates an irradiation light signal, and the irradiation light signal $S_0$ may be expressed as Equation 1 shown below.

$$s_0(t) = A_0 \cos(w_0 t) \quad \text{[Equation 1]}$$

As described above, the irradiation light signal may have various waveforms, however, hereinafter, the irradiation light signal has a cosine wave for convenience of explanation. Here $A_o$ denotes an amplitude of the irradiation light signal and $w_o$ denotes a frequency of the irradiation light signal.

Figure 2B:
Figure 2C:
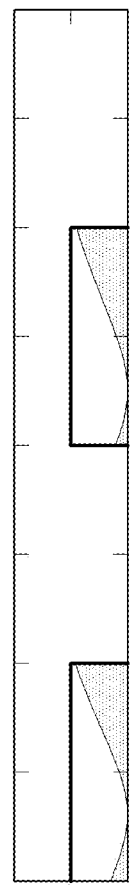
Figure 2D:
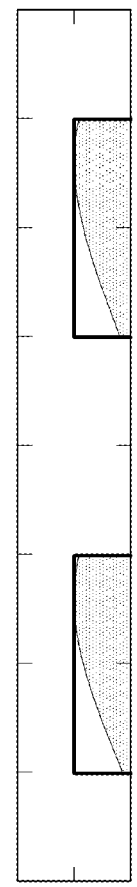
Figure 2E:
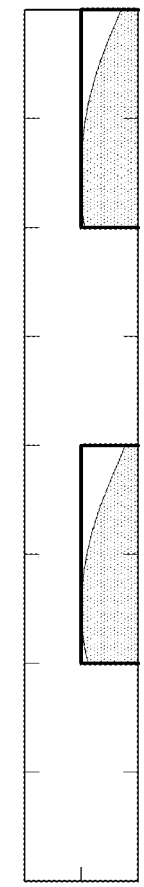
Figure 2F:
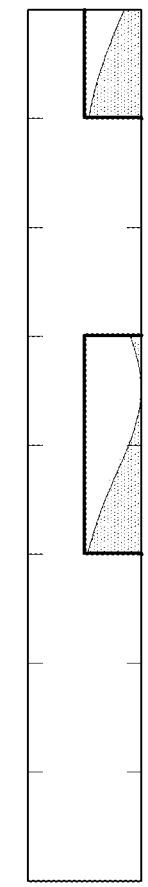

FIG. 2B illustrates a reflection light signal S from an object 50, and the reflection light signal S may be expressed as Equation 2 shown below.

$$s(t) = A \cos(w_0 t - \phi) + B \quad \text{[Equation 2]}$$

Since the irradiation light signal has a cosine waveform, the reflection light signal may have a cosine waveform. Here A denotes an amplitude of the reflection light signal and $w_o$ denotes a frequency of the irradiation light signal. Also, B denotes an offset signal which is generated by other light such as background radiation, etc. and $\Phi$ denotes a phase difference by the TOF.

The sensor 130 may sense the reflection light signals according to control signals whose phases are different from one another, i.e., control signals that are out of phase with each other. For example, the controller 120 may generate four control signals m0, m90, m180, and m270 which have a 90° phase difference from one another. For convenience of explanation, the four control signals are referred to as first through fourth control signals.

Referring to FIGS. 2C through 2F, the second control signal m90 has a 90° phase difference with respect to the first control signal m0, the third control signal m180 has a 180° phase difference with respect to the first control signal m0, and the fourth control signal m270 has a 270° phase difference with respect to the first control signal m0.

The sensor 130 may generate four phase difference signals (four integrated charge quantities) by sensing the reflection light signals starting from at 0°, 90°, 180°, and 270° phases respectively for a half period (T/2) of the reflection light signal, according to the first through the fourth control signals.

For example, the sensor 130 may sense the reflection light signal via the first control signal m0 and integrate the generated electrons to a first integrator, sense the reflection light signal via the second control signal m90 and integrate the generated electrons to a second integrator, sense the reflection light signal via the third control signal m180 and integrate the generated electrons to a third integrator, and sense the reflection light signal via the fourth control signal m270 and integrate the generated electrons to a fourth integrator.

The sensor 130 may generate a first phase difference signal $Q_{0°}$ corresponding to the charge quantity integrated by the first integrator, a second phase difference signal $Q_{90°}$ corresponding to the charge quantity integrated by the second integrator, a third phase difference signal $Q_{180°}$ corresponding to the charge quantity integrated by the third integrator, and a fourth phase difference signal $Q_{270°}$ corresponding to the charge quantity integrated by the fourth integrator.

The first integrator and the third integrator may be the same integrator, and the second integrator and the fourth integrator may be the same integrator. The present disclosure is not limited thereto, and the first through fourth integrators may be composed of various type of integrators.

Figure 3A:
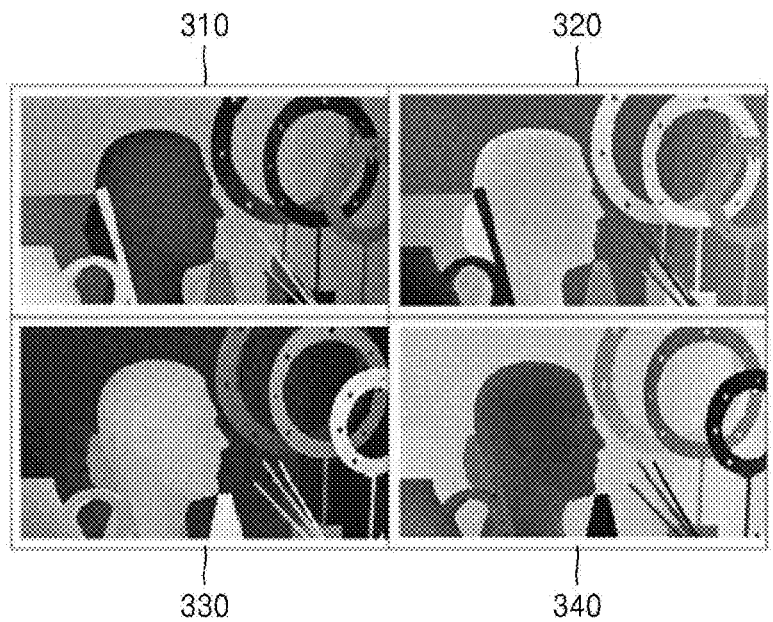
FIG. 3A shows phase difference images according to example embodiments.
Figure 3B:
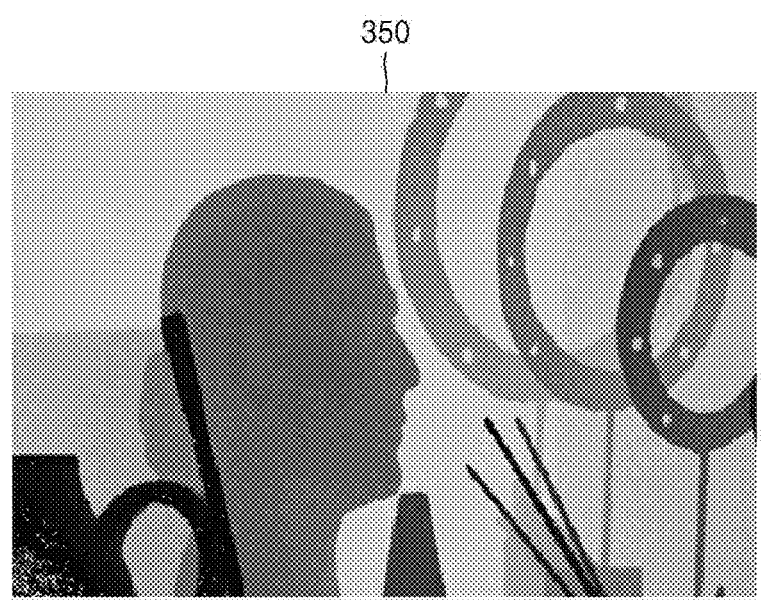
FIG. 3B shows a depth image according to example embodiments.

FIG. 3A shows phase difference images according to example embodiments, and FIG. 3B shows a depth image according to example embodiments. The image processor 150 of FIG. 1 may generate a plurality of phase difference images based on the phase difference signals (charge quantities of the integrated electrons) generated by the sensor 130.

For example, as shown in FIG. 3A, the image processor 150 may generate a first phase difference image 310 based on the first phase difference signal $Q_{0°}$, a second phase difference image 320 based on the second phase difference signal $Q_{90°}$, a third phase difference image 330 based on the third phase difference signal $Q_{180°}$, and a fourth phase difference image 340 based on the fourth phase difference signal $Q_{270°}$.

The image processor 150 may generate a depth image as shown in FIG. 3B, based on the plurality of phase difference images (the first through fourth phase difference images).

The image processor 150 may calculate a phase difference based on the plurality of phase difference signals, and calculate a depth (a distance) of the object by using the calculated phase difference. For example, the image processor 150 may calculate a phase difference Φ between the irradiation light signal and the reflection light signal using Equation 3 shown below, based on the plurality of phase difference signals (the integrated charge quantities). Also, a depth D of the object 50 may be calculated using Equation 4 shown below, by using the calculated phase difference Φ.

$$\phi = \arctan\left(\frac{Q_{270°} - Q_{90°}}{Q_{180°} - Q_{0°}}\right) \quad \text{[Equation 3]}$$

$$D = \frac{c}{2} \cdot \frac{\Delta\phi}{2\pi f} \quad \text{[Equation 4]}$$

As described above, when the depth of the object 50 has been calculated, the image processor 150 may generate a depth image by using the calculated depth. For example, as the depth increases, the image processor 150 may make a brightness value of a pixel larger, and as the depth decreases, the image processor 150 may make a brightness value of a pixel smaller. On the contrary, as the depth decreases, the image processor 150 may make a brightness value of a pixel larger, and as the depth increases, the image processor 150 may make a brightness value of a pixel smaller.

The image processor 150 may be realized by using a specified integrated circuit (IC) or an application specific integrated circuit (ASIC). Alternatively the image processor 150 may be realized by software which is installed in the depth image generating unit 100. In the case of using software, the image processor 150 may store the software in a movable storage medium such as a removable storage medium.

The image processor 150 may generate a depth image from which a motion artifact has been removed, and generate a depth image from which the motion artifact and an offset have been removed, based on the depth image from which the motion artifact has been removed and an existing depth image (from which the motion artifact has not been removed). A detailed description thereof will be given below.

The motion artifact occurs when a camera (a depth image generating apparatus) or an object moves while capturing the object. For example, when the camera or the object moves, a phase variation of a reflected light signal occurs. Thus, a phase difference signal (an integrated charge quantity) changes, and the motion artifact may occur in the depth image that is generated based on the changed phase difference signal.

Hereinafter, for the convenience of explanation, the depth image generating apparatus operates using a 4-phase/2-tap method, and the first phase difference signal $Q_{0°}$ and the third phase difference signal $Q_{180°}$ are simultaneously measured during a half period, and then, the second phase difference signal Q90° and the fourth phase difference signal Q270° are simultaneously measured during another half period.

In a case in which the object moves when the depth image generating apparatus 100 measures the second phase difference signal Q90° and the fourth phase difference signal Q270° with respect to an area where the object is positioned, the second phase difference signal Q90° and the fourth phase difference signal Q270° may include a component of a reflection light signal from a background as well as a component of a reflection light signal from the object. In this case, if the depth of the object is calculated using Equations 3 and 4, an incorrectly calculated depth value is acquired. The incorrectly calculated depth value is referred to as the motion artifact.

As described above, in a case in which the first phase difference Q0° and the third phase difference signal Q180° are measured during a half period, and then, the second phase difference Q90° and the fourth phase difference signal Q270° are measured during another half period, if there exists no offset signal B, the following Equations 5 and 6 are obtained.

$$Q_{0°} + Q_{180°} = Q_{270°} + Q_{90°} = K \quad \text{[Equation 5]}$$

$$|Q_{0°} - Q_{180°}| + |Q_{90°} - Q_{270°}| = K \quad \text{[Equation 6]}$$

The following Equations 7 and 8 may be obtained from Equations 5 and 6.

$$|Q_{0°} - Q_{180°}| = Q_{90°} + Q_{270°} - |Q_{90°} - Q_{270°}| \quad \text{[Equation 7]}$$

$$|Q_{90°} - Q_{270°}| = Q_{0°} + Q_{180°} - |Q_{0°} - Q_{180°}| \quad \text{[Equation 8]}$$

Referring to Equations 7 and 8, a value $|Q_{90°} - Q_{270°}|$ may be calculated by using the first phase difference signal $Q_{0°}$ and the third phase difference signal $Q_{180°}$, and a value $|Q_{0°} - Q_{180°}|$ may be calculated by using the second phase difference signal $Q_{90°}$ and the fourth phase difference signal $Q_{270°}$. For example, when measuring the first phase difference signal $Q_{0°}$ and the third phase difference signal $Q_{180°}$, if the object is moved, a value $|Q_{0°} - Q_{180°}|$ may be calculated by using the second phase difference signal $Q_{90°}$ and the fourth phase difference signal $Q_{270°}$ measured when the object has not moved.

Meanwhile, when measuring the first phase difference signal $Q_{0°}$ and the third phase difference signal $Q_{180°}$, if a sign of $Q_{0°} - Q_{180°}$) is not changed despite movement of the object, and when measuring the second phase difference signal $Q_{90°}$ and the fourth phase difference signal $Q_{270°}$, if a sign of ($Q_{90°} - Q_{270°}$) is not changed despite movement of the object, then Equations 7 and 8 may be expressed as Equations 9 and 10 shown below.

$$Q'_{0°} - Q'_{180°} = \text{sign}(Q_{0°} - Q_{180°}) \cdot (Q_{90°} + Q_{270°} - |Q_{90°} - Q_{270°}|) \quad \text{[Equation 9]}$$

$$Q'_{90°} - Q'_{270°} = \text{sign}(Q_{90°} - Q_{270°}) \cdot (Q_{0°} + Q_{180°} - |Q_{0°} - Q_{180°}|) \quad \text{[Equation 10]}$$

Q' denotes a phase difference signal which is expected to be measured when the motion artifact does not occur (that is, when the object does not move). That is, the measured phase difference signal is a phase difference signal from which the motion artifact has been removed.

Equations 9 and 10 are induced in a state in which an offset signal does not exist. However, when the phase difference signal is measured by sensing the reflected light signal reflected from the object, the offset signal may be included in the phase difference signal due to other light such as background radiation, etc.

In a case in which the motion artifact does not exist (that is, the object does not move), Equation 3 for calculating the phase difference Φ has an effect of removing the offset signal which is commonly included in the reflection light signal by performing a minus operation. Accordingly, the offset signal does not have an influence on the phase difference (Φ) and the depth value D.

Meanwhile, if the offset signal B is considered, Equation 6 may be expressed as Equation 11 shown below.

$$|Q_{0°} - Q_{180°}| + |Q_{90°} - Q_{270°}| = K + 2B \quad \text{[Equation 11]}$$

Accordingly, Equations 9 and 10 may be expressed as Equations 12 and 13 shown below.

$$Q'_{0°} - Q'_{180°} = \\ \text{sign}(Q_{0°} - Q_{180°}) \cdot (Q_{90°} + Q_{270°} + 2B - |Q_{90°} - Q_{270°}|) = \\ \text{sign}(Q_{0°} - Q_{180°})(Q_{90°} + Q_{270°} - |Q_{90°} - Q_{270°}|) + \\ 2B \cdot \text{sign}(Q_{0°} - Q_{180°}) = \text{sign}(Q_{0°} - Q_{180°}) \\ (Q_{90°} + Q_{270°} - |Q_{90°} - Q_{270°}|) + E_{Blur(0°,180°)}$$ [Equation 12]

$$Q'_{90°} - Q'_{270°} = \\ \text{sign}(Q_{90°} - Q_{270°}) \cdot (Q_{0°} + Q_{180°} + 2B - |Q_{0°} - Q_{180°}|) = \\ \text{sign}(Q_{90°} - Q_{270°}) \cdot (Q_{0°} + Q_{180°} - |Q_{0°} - Q_{180°}|) + \\ 2B \cdot \text{sign}(Q_{90°} - Q_{270°}) = \text{sign}(Q_{90°} - Q_{270°}) \cdot \\ (Q_{0°} + Q_{180°} - |Q_{0°} - Q_{180°}|) + E_{blur(90°,180°)}$$ [Equation 13]

Therefore, as shown in Equations 12 and 13, a difference between the phase difference signals $Q'_{0°}-Q'_{180°}$ or $Q'_{90°}-Q_{270°}$, from which the motion artifact has been removed, includes value ($E_{Blur}$) due to the offset signal.

Figure 4A:
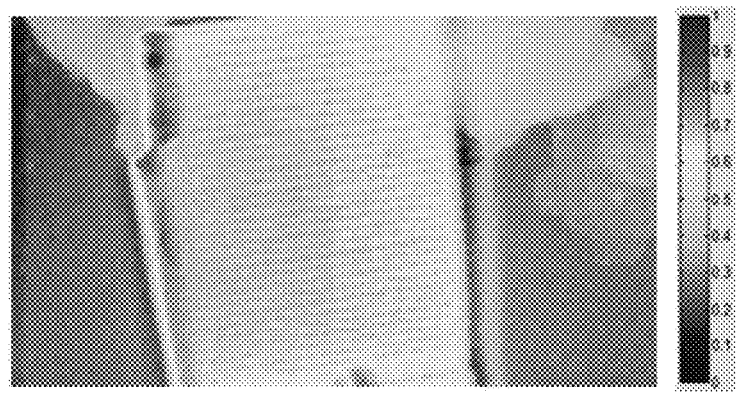
FIG. 4A shows a depth image from which the motion artifact has not been removed and FIG. 4B shows a depth image from which the motion artifact has been removed.
Figure 4B:
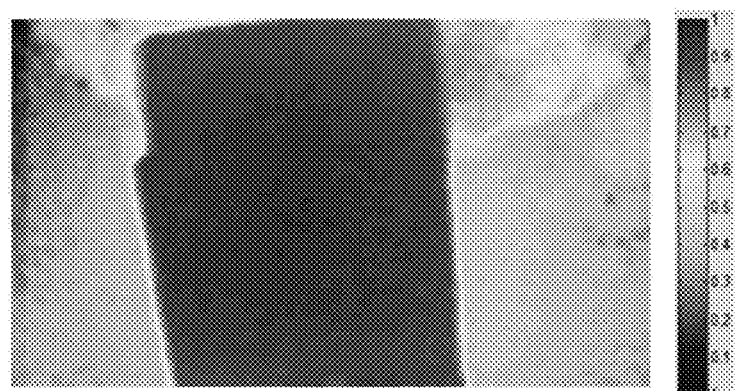

Referring to FIG. 4, FIG. 4A shows a depth image to which Equation 3 has been applied (a depth image from which the motion artifact has not been removed), and FIG. 4B shows a depth image to which Equation 12 or 13 has been applied (a depth image from which the motion artifact has been removed). Although the motion artifact has been removed from the depth image in FIG. 4B, a whole depth value of the depth image of FIG. 4B has been changed due to an effect of the offset signal. That is, a whole color has been changed.

Therefore, the depth image generating apparatus according to example embodiments may generate a depth image from which a motion artifact and an offset signal have been removed, based on an existing depth image from which the motion artifact has not been removed (a depth image to which Equation 3 has been applied) and a depth image from which the motion artifact has been removed (a depth image to which Equation 12 or 13 has been applied).

For example, the depth image generating apparatus may acquire depth information by removing an offset effect from the existing depth image (hereinafter, referred to as first depth image), and may acquire shape information by removing a motion artifact from the first depth image (hereinafter, referred to as second depth image). A detailed description thereof will be described below.

The depth image generating apparatus 100 may determine an area where the motion artifact has occurred. For example, Equation 5 must be satisfied for a whole area according to TOF theory. In a case in which Equation 5 has not been satisfied, this means that the motion artifact has occurred excluding special cases such as rapid change in reflectivity of the object and change in other light such as sunlight.

Accordingly, the motion artifact determining unit 140 may calculate an error EMA due to the motion artifact by using Equation 14 shown below, and determine a motion artifact area based on the error EMA.

$$E_{MA} = |Q_{0°} + Q_{180°} - (Q_{90°} + Q_{270°})|$$ [Equation 14]

$$B(x) = \begin{cases} E_{MA}(x) \geq th, \text{ motion artifact area} \\ E_{MA}(x) < th, \text{ non-motion artifact area} \end{cases}$$ [Equation 15]

As shown in Equation 15, the motion artifact determining unit 140 compares the calculated error $E_{MA}$ of an area of the object with a critical value th, and when the error EMA is equal to or greater than the critical value th, the motion artifact determining unit 140 determines the area as a motion artifact area, and when the error EMA is less than the critical value th, the motion artifact determining unit 140 determines the area as a non-motion artifact area. The critical value th is a constant which is determined according to noise level of a system or a scene.

The image processor 150 may align depth values of an area in the first depth image and the second depth image, from which an area that has been determined as a motion artifact area, has been excluded, in an order of amplitude.

Figure 5:
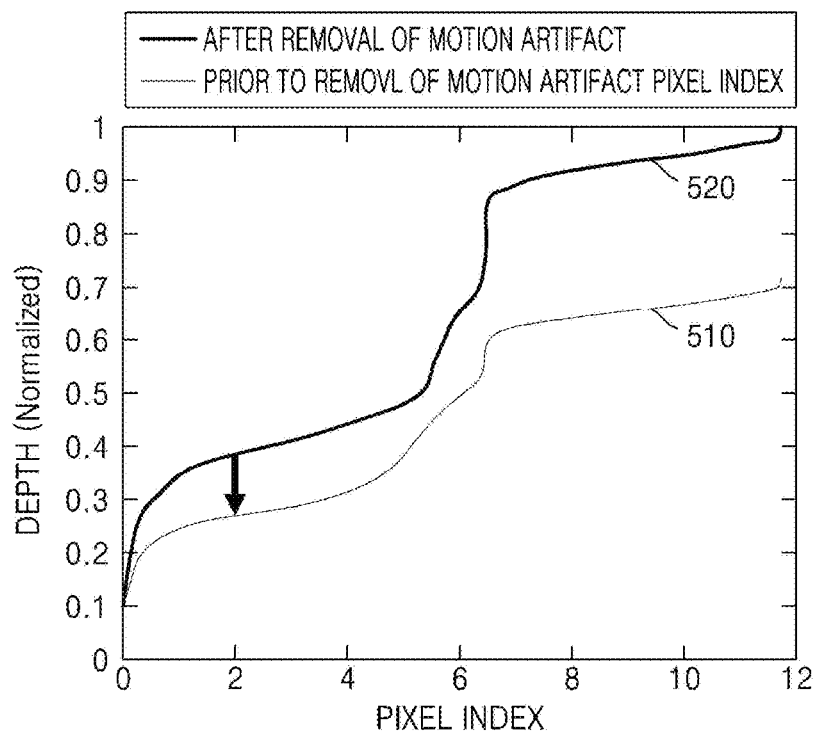
FIG. 5 is a graph showing depth values of a depth image from which a motion artifact has not been removed and depth values of another depth image from which the motion artifact has been removed, according to example embodiments.

For example, a first curve 510 of FIG. 5 shows aligned depth values (pixel values) of a remaining area of the first depth image from which a motion artifact area has been excluded and a second curve 520 of FIG. 5 shows aligned depth values of a remaining area of the second depth image, from which a motion artifact area has been excluded. The aligned depth values of the curves 510 and 520 are aligned in the order of amplitude thereof.

The depth image generating apparatus 100 can change depth values of the second depth image from which the motion artifact has been removed, based on corresponding relationships in the depth values of the first depth image and the second depth image.

For example, the depth image generating apparatus 100 can change first depth value in the second curve 520 into a corresponding second depth value in the first curve 510, based on the first curve 510 and the second curve 520. That is, a depth value of a pixel having a pixel index 2 in the second curve 520 can be changed into a depth value of a pixel having the pixel index 2 in the first curve 510. Depth values of remaining pixels in the second curve 520 can be changed in the same manner as described above.

Figure 4C:
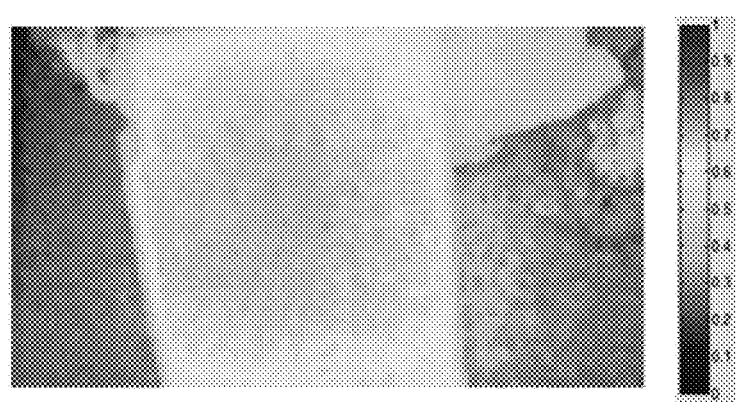
FIG. 4C shows a depth image in which a matching has been performed, according to example embodiments.

Accordingly, as shown in FIG. 4C, the depth image generating apparatus 100 may generate a depth image (hereinafter referred to as fourth depth image) from which a motion artifact has been removed and in which depth matching has been performed.

The depth image generating apparatus 100 may generate a depth image from which a motion artifact and an offset effect have been removed by combining the first depth image and the fourth image. The depth image generating apparatus 100 may calculate a weight factor W with respect to the first depth image and the fourth depth image, based on an amplitude of the motion artifact, by using Equation 16 shown below.

$$W(x) = \frac{1}{e^{s1*(E_{MA}(x)-s2)}}$$ [Equation 16]

Where $E_{MA}$ denotes an error value which is calculated using Equation 14, 51 denotes a slope of the weight factor W value which changes according to $E_{MA}$, and s2 denotes an $E_{MA}$ value from which the weight factor W value starts to change. S1 and s2 may be values which are determined by experiment.

As the motion artifact increases, the weight factor W gets closer to zero, and as the motion artifact decreases, the weight factor W gets closer to 1. That is, the first depth image and the fourth depth image may be combined by increasing the weight factor W of the fourth depth image in a high motion artifact area, and increasing the weight factor W of the first depth image in a low motion artifact area.

Meanwhile, the depth image generating apparatus 100 may combine the first depth image and the fourth depth image by using a wavelet transform. For example, the depth image generating apparatus 100 may perform the wavelet transform with respect to the first depth image, and acquire a wavelet coefficient $G_0$ of the first depth image. Also, the depth image generating apparatus 100 may perform the wavelet transform with respect to the fourth depth image, and acquire a wavelet coefficient $G_M$ of the fourth depth image.

The depth image generating apparatus 100 may calculate a wavelet coefficient $G_F$ based on the wavelet coefficient $G_0$ of the first depth image, the wavelet coefficient $G_M$ of the fourth depth image, and the weight factor W calculated using Equation 16, by using Equation 17 shown below.

$$G_F = G_M + W \cdot (G_0 - G_M) \qquad \text{[Equation 17]}$$

Figure 6:
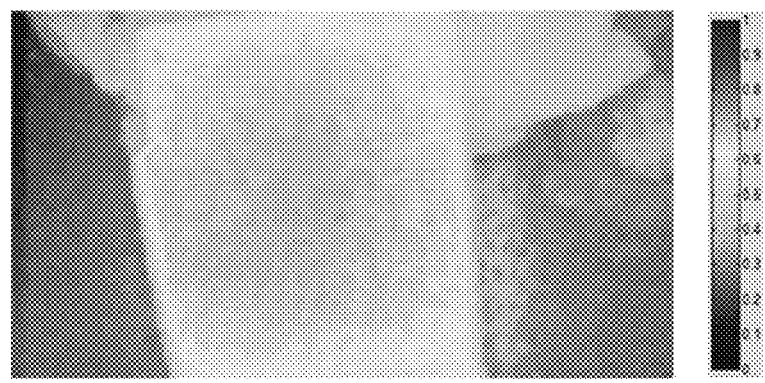
FIG. 6 shows a depth image from which a motion artifact and an offset effect have been removed, according to example embodiments.

The depth image generating apparatus 100 may generate a new depth image (hereinafter, referred to as a third depth image) as shown in FIG. 6, by performing an inverse-wavelet transform on the wavelet coefficient $G_F$ calculated by Equation 17. The third depth image has a depth value of the first depth image (from which an offset effect has been removed), and may be an image from which the motion artifact has been removed. That is, the third depth image may include the depth information of the first depth image and the shape information of the depth image.

Figure 7:
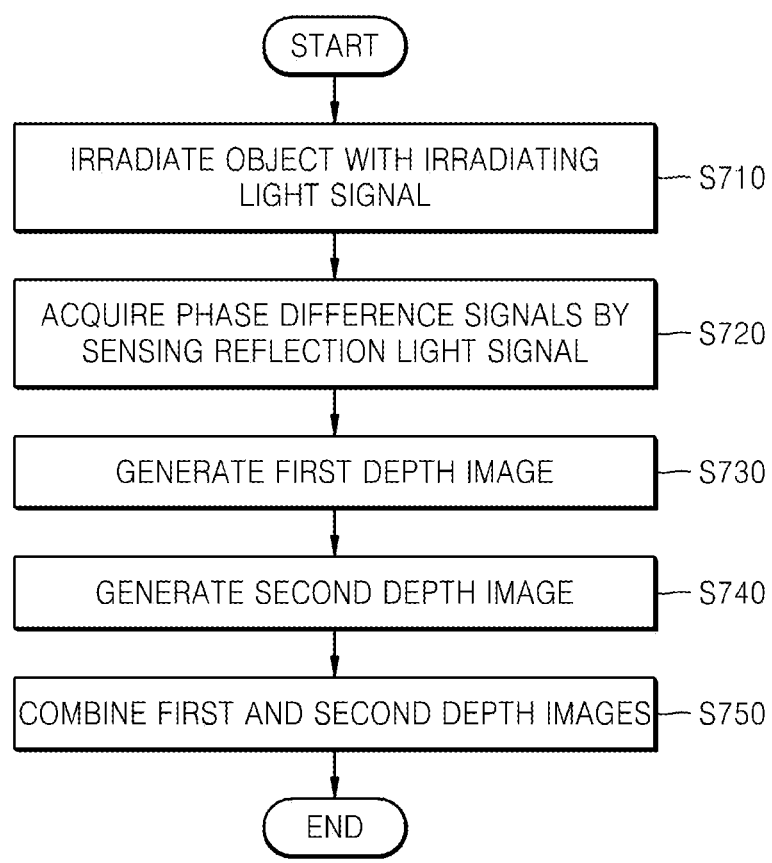
FIG. 7 is a flowchart illustrating a method of generating a depth image according to example embodiments.

FIG. 7 is a flowchart illustrating a method of generating a depth image according to example embodiments.

Referring to FIG. 7, an irradiation light signal may be emitted onto an object (Operation S710).

The irradiation light signal may be a NIR ray having a wavelength of about 850 nm, which is invisible to the naked eye, and may have a continuous periodic function form with a predetermined period. For example, the irradiation light signal may have a specially defined waveform such as a sine wave, a ramp wave, a rectangular wave, etc., and optionally, the irradiation light signal may have a waveform which is not generally defined (or may have an undefined waveform).

A plurality of phase difference signals which have different phase differences from one another, may be acquired by sensing a reflection light signal which is reflected from the object (Operation S720).

For example, the reflection light signal may be sensed by a plurality of control signals which have different phase differences from one another, and the plurality of control signals may include four control signals which have a 90° phase difference from one another. Accordingly, first through fourth phase difference signals $Q_{0°}$, $Q_{90°}$, $Q_{180°}$, and $Q_{270°}$ may be acquired according to first through fourth control signals.

A first depth image may be generated based on the acquired plurality of phase difference signals (Operation S730).

For example, a phase difference $\Phi$ between the irradiation light signal and the reflection light signal may be calculated by using the first through the fourth phase difference signals and Equation 3. Also, a depth of the object may be calculated by using the calculated phase difference $\Phi$ in Equation 4.

If the depth of the object is calculated, then the first depth image may be generated by using the calculated depth. For example, as a depth increases, a brightness value of a pixel may be controlled to be larger, and as a depth decreases, a brightness value of a pixel may be controlled to be smaller. On the contrary, as a depth decreases, a brightness value of a pixel may be controlled to be larger, and as a depth increases, a brightness value of a pixel may be controlled to be smaller. Example embodiments are not limited thereto.

A second depth image may be generated based on the reflection light signals, in which a motion artifact has not occurred, among the plurality of reflection light signals (Operation S740).

For example, a depth and a phase difference $\Phi$ between the irradiation light signal and the reflection light signal from which the motion artifact has been removed are calculated by using Equation 12 or 13, and the second depth image is generated based thereon.

Hereinafter, a third depth image may be generated by combining the first depth image and the second depth image (Operation S750).

For example, an area where the motion artifact has occurred may be determined, and a weight factor with respect to the first depth image and the second depth image may be calculated, based on the area where the motion artifact has occurred and an amplitude of the motion artifact. Accordingly, the third depth image may be generated by combining the first depth image and the second depth image to which the calculated weight factor has been applied.

Figure 8:
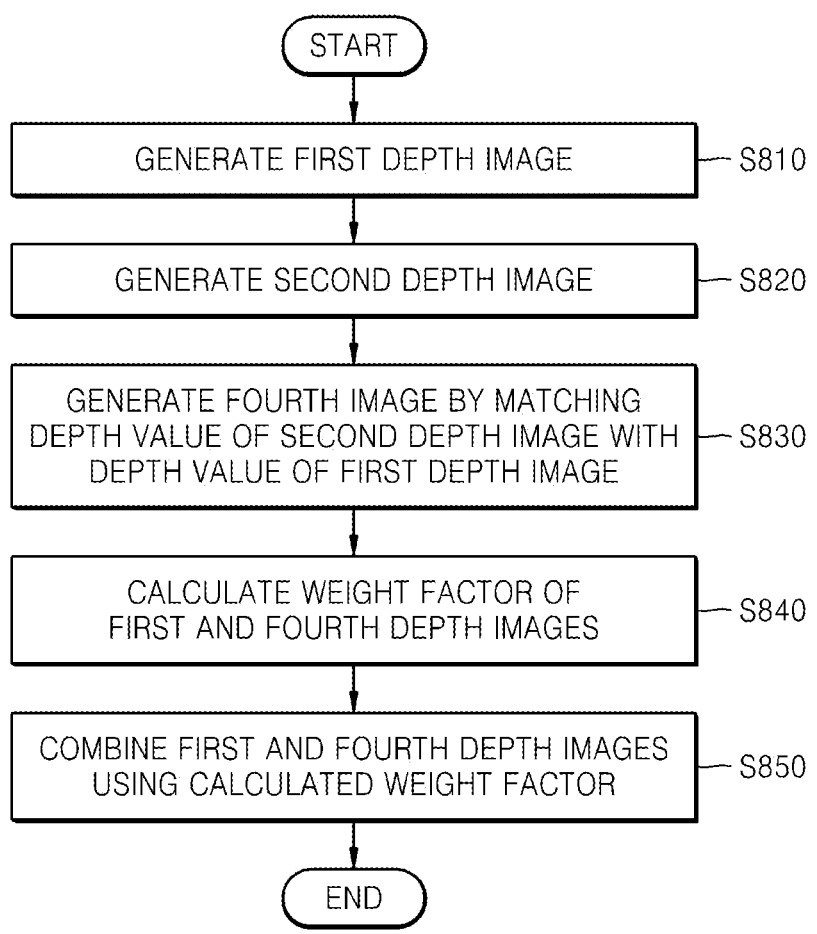
FIG. 8 is a flowchart illustrating a method of generating a depth image according to example embodiments.

FIG. 8 is a flowchart illustrating a method of generating a depth image according to example embodiments.

Referring to FIG. 8, a first depth image may be generated (Operation S810). Also, a second depth image may be generated (Operation S820). Operation S810 corresponds to operation S730 in FIG. 7, and operation S820 corresponds to operation S740 in FIG. 7, therefore detailed descriptions thereof will be omitted here.

Operations S830 through S850 may be an embodiment of operation S750 in FIG. 7, however, the present disclosure is not limited thereto.

A fourth depth image may be generated by matching a depth value of the second depth image with a depth value of the first depth image (Operation S830).

For example, the depth value of the second depth image from which a motion artifact has been removed, may be changed based on a corresponding relationship between the depth value of the first depth image and the depth value of the second depth image. The depth value of the second depth image may be matched with the corresponding depth value of the first depth image by aligning depth values (pixel values) of a remaining area of the first depth image in an amplitude order, from which a motion artifact area has been excluded, and aligning depth values of a remaining area of the second depth image in an amplitude order, from which a motion artifact area has been excluded. Accordingly, the fourth depth image with respect to which depth matching has been performed and the depth value of the second depth image has been changed into the depth value of the first depth image, may be generated.

A weight factor of the first depth image and the fourth depth image may be calculated (Operation S840).

For example, the weight factor of the first depth image and the fourth depth image may be calculated based on an amplitude of the motion artifact. As the motion artifact increases, the weight factor gets closer to zero, and as the motion artifact decreases, the weight factor gets closer to 1.

The first depth image and the fourth depth image may be combined by applying the calculated weight factor thereto (Operation S850).

For example, the depth image and the fourth depth image may be combined by using a wavelet transform. For example, the wavelet transform is performed with respect to the first depth image, and a wavelet coefficient $G_0$ of the first depth image may be acquired. Also, the wavelet transform may be performed with respect to the fourth depth image, and a wavelet coefficient $G_M$ of the fourth depth image may be acquired.

A weight factor wavelet coefficient $G_F$ may be calculated based on the wavelet coefficient $G_0$ of the first depth image, the wavelet coefficient $G_M$ of the fourth depth image and the weight factor W calculated by using Equation 16, and the third depth image may be generated by performing inverse-wavelet transform on the calculated wavelet coefficient $G_F$.

Accordingly, the third depth image may include the depth value of the first depth image, from which the offset effect has been removed, and may be an image from which the motion artifact has been removed. That is, the third depth image may include depth information of the first depth image and shape information of the second depth image.

In addition, the depth image generating method according to example embodiments can also be implemented through computer readable code/instructions recorded in/on a medium, e.g., a computer readable medium, to control at least one processing element to implement any of the above described embodiments. The medium can correspond to any medium/media permitting the storage and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure capable of including or carrying a signal or information, such as a device carrying a bitstream according to example embodiments. The media may also be a distributed network, so that the computer readable code is stored/transferred and executed in a distributed fashion. Furthermore, the processing element may include a processor or a computer processor, and processing elements may be distributed and/or included in a single device.

As described above, the depth image generating apparatus according to example embodiments can generate a depth from which where a motion artifact and an offset effect have been removed by combining two depth image.

It should be understood that example embodiments described herein should be considered in a descriptive sense only and not for purposes of limitation. Descriptions of features or aspects within each example embodiment should typically be considered as available for other similar features in other example embodiments.

While example embodiments have been described with reference to the figures, it will be understood by those of ordinary skill in the art that various changes in form and details may be made therein without departing from the spirit and scope of the present concept as defined by the following claims.

What is claimed is:

1. A method of generating a depth image, the method comprising:
    irradiating an object with light generated from a light source;
    acquiring a plurality of phase difference signals which have different phase differences from one another, by sensing a reflection light reflected from the object;
    generating first phase difference images based on the plurality of phase difference signals;
    generating a first depth image based on the first phase difference images, wherein the first depth image comprises a motion artifact;
    generating second phase difference images based on phase difference signals, from among the plurality of phase difference signals, in which the motion artifact has not occurred;
    generating a second depth image based on the second phase difference images, wherein the second depth image comprises an offset effect; and
    generating a third depth image by combining the first depth image and the second depth image.

2. The method of claim 1, wherein the acquiring of the plurality of phase difference signals comprises acquiring a plurality of phase difference signals based on control signals having different phase differences from one another.

3. The method of claim 1, wherein the second depth image is a depth image from which the motion artifact has been removed, to produce the offset effect of the second depth image.

4. The method of claim 1, wherein the generating of the third depth image comprises:
    generating a fourth depth image by changing some of depth values of the second depth image into corresponding depth values of the first depth image; and
    generating the third depth image by combining the first depth image and the fourth depth image.

5. The method of claim 4, further comprising calculating a weight factor with respect to the first depth image and the fourth depth image, based on an amplitude of the motion artifact,
    wherein the generating of the third depth image by combining the first depth image and the fourth depth image comprises combining the first depth image and the fourth depth image based on the calculated weight factor.

6. The method of claim 4, wherein the generating of the third depth image comprises:
    acquiring a first wavelet coefficient by performing a wavelet transform on the first depth image,
    acquiring a second wavelet coefficient by performing the wavelet transform on the fourth depth image,
    acquiring a third wavelet coefficient based on the first wavelet coefficient and the second wavelet coefficient, and
    acquiring the third depth image by performing an inverse-wavelet transform on the third wavelet coefficient.

7. The method of claim 1, wherein the third depth image comprises depth information of the object from the first depth image, and shape information of the object from the second depth image.

8. The method of claim 1, wherein the third depth image comprises an image from which the motion artifact of the first depth image and the offset effect of the second depth image have each been removed.

9. A non-transitory computer-readable medium having recorded thereon a program, which when executed by a computer, performs the method of claim 1.

10. An apparatus for generating a depth image, the apparatus comprising:
    a light irradiator configured to irradiate an object with light generated from a light source;
    a sensor configured to acquire a plurality of phase difference signals which have different phase differences from one another by sensing a reflection light reflected from the object; and
    an image processor configured to
        generate first phase difference images based on the plurality of phase difference signals, generate a first depth image based on the first phase difference images, wherein the first depth image comprises a motion artifact, generate second phase difference images based on phase difference signals, from among the plurality of phase difference signals, in which the motion artifact has not occurred, generate a second depth image based on the second phase difference images, wherein the second depth image comprises an offset effect, and generate a third depth image by combining the first depth image and the second depth image.

11. The apparatus of claim 10, wherein the sensor acquires the plurality of phase difference signals based on control signals having different phase differences from one another.

12. The apparatus of claim 10, wherein the second depth image comprises a depth image from which the motion artifact has been removedto produce the offset effect of the second depth image.

13. The apparatus of claim 10, wherein the image processor is further configured to generate a fourth depth image by changing some of depth values of the second depth image into corresponding depth values of the first depth image, and generate the third depth image by combining the first depth image and the fourth depth image.

14. The apparatus of claim 13, wherein the image processor is further configured to calculate a weight factor with respect to the first depth image and the fourth depth image based on an amplitude of the motion artifact, and to combine the first depth image and the fourth depth image based on the calculated weight factor.

15. The apparatus of claim 13, wherein the image processor is further configured to acquire a first wavelet coefficient by performing a wavelet transform on the first depth image, acquire a second wavelet coefficient by performing the wavelet transform on the fourth depth image, acquire a third wavelet coefficient based on the first wavelet coefficient and the second wavelet coefficient, and acquire the third depth image by performing inverse-wavelet transform on the third wavelet coefficient.

16. The apparatus of claim 10, wherein the third depth image comprises depth information of the object from the first depth image, and shape information of the object from the second depth image.

17. The method of claim 10, wherein the third depth image comprises a depth image from which the motion artifact of the first depth image and the offset effect of the second depth image have each been removed.

18. A method of generating a depth image, the method comprising:

acquiring a plurality of phase difference signals that are each out of phase with one another by sensing a reflection light reflected from an object irradiated with light;

generating first phase difference images based on the plurality of phase difference signals;

generating a first depth image based on the first phase difference images, wherein the first depth image comprises a motion artifact;

generating second phase difference images based on phase difference signals, from among the plurality of phase difference signals, in which a motion artifact has not occurred;

generating a second depth image based on the second phase difference images, wherein the second depth image comprises an offset effect; and combining the first depth image and the second depth image to generate a third depth image in which the motion artifact of the first depth image and the offset effect of the second depth image have been removed.

* * * * *